United States Patent Office 3,520,832
Patented July 21, 1970

3,520,832
FLAME RESISTANT EPOXY RESINS AND PROCESS
OF MAKING SAME
Wilhelm Vogt, Cologne-Sulz, Paul Janssen, Cologne, and
Hermann Richtzenhain, Cologne-Sulz, Germany, assignors to Dynamit Nobel A.G., Troisdorf, Bezirk
Cologne, Germany, a corporation of Germany
No Drawing. Filed July 15, 1965, Ser. No. 472,311
Claims priority, application Germany, July 17, 1964,
D 44,968
Int. Cl. C08g 30/10
U.S. Cl. 260—2
9 Claims

ABSTRACT OF THE DISCLOSURE

Flame resistant resins from epoxy compounds are produced by hardening epoxy resins having more than one 1,2 epoxy group per molecule, with a mixed ester anhydride of aromatic orthohydroxy carboxylic acids and trivalent or quinquevalent phosphorus compound reactive with the aromatic hydroxycarboxylic acid to form the fixed ester anhydride. The mixed ester can be, for example,

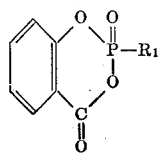

wherein $R_1$ is chlorine, bromine, thiocyano, alkyl, aryl, aralkyl, alkaryl, chloralkyl, alkoxy, aryloxy or cycloalkyl.

---

The subject of the invention is flame resistant molding and coating compounds which can be derived from polyfunctional epoxy compounds and phosphorus-containing hardeners which are made out of sometimes substituted, aromatic orthohydroxycarboxylic acids and acids of trivalent or quinquevalent phosphorus.

Flame resistance is the technically valuable ability of a synthetic resin which has been ignited by a flame to extinguish itself promptly instread of continuing to burn indefinitely and constantly.

The manufacture of epoxy resin compounds with flame resistant properties is in the prior art. Flame resistant properties can be achieved, for example, by the use of hardeners containing chlorine or bromine, such as dichloromaleic acid anhydride, tetrachlorophthalic acid anhydride or hexachloroendomethylenetetrahydrophthalic acid anhydride. The use of epoxy resins containing chlorine or bromine, such as the diglycidyl ether of tetrachloro or tetrabromo diphenylol propane, also results in products with flame resistant properties. Another possibility consists in the use of additives which contain chlorine, bromine and/or phosphorus, such as triphenyl phosphite or tri-β-chloroethyl phosphate. Flame resistant compounds on a basis of components containing chlorine or bromine require a relatively high chlorine or bromine content. This high halogen content, however, frequently results in extreme technical disadvantages. For example, an epoxy resin made from tetrachloro or tetrabromo diphenylolpropane and epichlorhydrin has a high viscosity and is therefore substantially more difficult to work with than, say, a corresponding resin made of halogen-free diphenylolpropane. Another possibility for the manufacture of flame resistant compounds is the use of epoxy resins containing phosphorus and made, for example, by the transposition of epoxies containing hydroxyl groups with the halides of phosphoric, phosphonic, or phosphinic acids, or by the transposition of epi-halogenhydrines with dialkylphosphites. Another known method is the use of phosphoric acid, acid phosphoric acid esters, tertiary phosphites and phosphonic acids as hardeners for epoxy resins. The mechanical characteristics of the compounds obtained with these hardeners do not, however, meet the necessary requirements, especially on account of their great brittleness.

It has now been found that it is surprisingly possible to make flame resistant molding and coating compounds with good mechanical properties from epoxy compounds having two or more epoxy groups per molecule, if the conventional hardening agents are replaced wholly or partially by phosphorous compounds of the cyclic, mixed ester anhydride type made from sometimes substituted aromatic orthohydroxycarboxylic acids and acids of trivalent or quinquevalent phosphorous compounds reactive with the aromatic compounds to form the mixed esters.

Characteristically, the hardeners of the invention contain the group

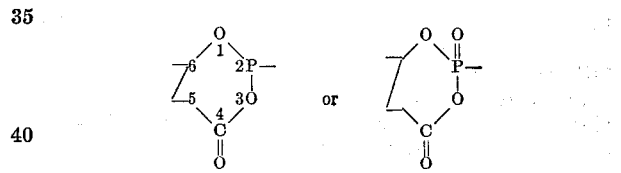

wherein the Z's are aryl radicals having among their ring carbon atoms the 5 and 6 position carbon atoms of the phosphorus containing rings.

Compounds of this kind can be described by the following general formulas, for example:

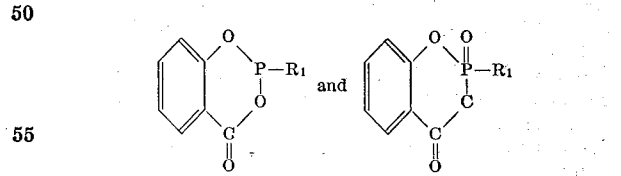

wherein $R_1$ may be chlorine or bromine, or a NCS-(thiocyano), alkyl, aryl, aralkyl, alkaryl, chloralkyl, alkoxy, aryloxy and cycloalkyl radical, and the aromatic nucleus can be substituted e.g., by chlorine or bromine and lower alkyl groups with up to 4 carbon-atoms. However, the symmetrical compounds of the following general formulas can be used according to the invention:

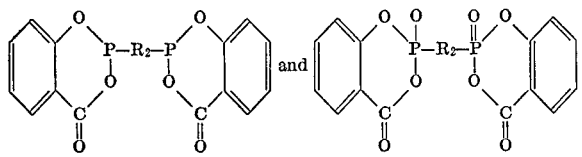

wherein $R_2$ may be a bivalent alcoxylene, bis oxyarylene, alkylene, arylene or hetrocyclic radical and the aromatic nuclea may be substituted. The substituents $R_1$ and $R_2$ preferably contain up to about 12 carbon atoms, more preferably up to about 8 carbon atoms.

To indicate the nomenclature used herein, the first compound structural formula given above, for $R_1$ being methyl, is called 2-methyl-4-oxo-5,6-benzo-1,3,2-dioxa phosphorinine.

The compounds of the above kind can be obtained by known processes, as for example by the transposition of aromatic o-hydroxycarboxylic acids (which may be further substituted if desired) with phosphorus trichloride, phosphorous tribromide, dichlorophosphorous acid esters, dichlorophosphoric acid esters, and dichlorophosphonic and dichlorophosphinic acids, respectively the bis compounds by reacting 2 moles of 2-chloro-4-oxo-5,6-benzo-1,3,2-dioxaphosphorinine with alkylenglycols, divalent phenols, or by reacting compounds of the general formula

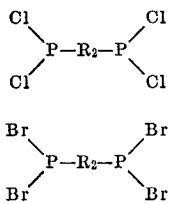

with two mols of aromatic o-hydroxycarboxylic acids.

Of the aromatic o-hydroxycarboxylic acid, salicylic acid is especially suitable, as well as its substitution products, such as the monochloro or dichloro or monobromo or dibromo salicylic acids, and the o-hydroxynaphthalene carboxylic acids corresponding thereto.

By the reaction of these acid components and the previously described phosphorus compounds, the following compounds, for example, are obtained:

2-chloro-4-oxo-5,6-benzo-1,3,2-dioxaphosphorinine,
2-methoxy-4-oxo-5,6-benzo-1,3,2-dioxaphosphorinine,
2-ethoxy-4-oxo-5,6-benzo-1,3,2-dioxaphosphorinine,
2-phenoxy-4-oxo-5,6-benzo-1,3,2-dioxaphosphorinine,
2-methyl-4-oxo-5,6-benzo-1,3,2-dioxaphosphorinine,
2-ethyl-4-oxo-5,6-benzo-1,3,2-dioxaphosphorinine,
2-phenyl-4-oxo-5,6-benzo-1,3,2-dioxaphosphorinine,
2,4-dioxo-2-chloro-5,6-benzo-1,3,2-dioxaphosphorinine,
2,4-dioxo-2-thiocyano-5,6-benzo-1,3,2-dioxaphosphorinine,
2,4-dioxo-2-methyl-5,6-benzo-1,3,2-dioxaphosphorinine,
2,4-dioxo-2-chloromethyl-5,6-benzo-1,3,2-dioxophosphorinine,
2,4-dioxo-2-chloroethyl-5,6-benzo-1,3,2-dioxaphosphorinine,
2,4-dioxo-2-ethyl-5,6-benzo-1,3,2-dioxaphosphorinine,
2,4-dioxo-2-propyl-5,6-benzo-1,3,2-dioxaphosphorinine,
2,4-dioxo-2-isopropyl-5,6-benzo-1,3,2-dioxaphosphorinine,
2,4-dioxo-2-phenyl-5,6-benzo-1,3,2-dioxaphosphorinine,
2,4-dioxo-2-methoxy-5,6-benzo-1,3,2-dioxaphosphorinine,
2,4-dioxo-2-ethoxy-5,6-benzo-1,3,2-dioxaphosphorinine,
2,4-dioxo-2-phenoxy-5,6-benzo-1,3,2-dioxaphosphorinine.

The hardeners of the invention are useful as disclosed with the known epoxy resins. It is mainly epoxy compounds with more than one 1,2-epoxy group in the molecule that are used as epoxy compounds for the manufacture of the flame resistant molding and coating compounds according to the invention. Particularly suitable are the poly epoxies of polyunsaturated hydrocarbons (vinylcyclohexene, dicyclopentadiene, cyclohexadiene, cyclododecatriene, butadiene, polybutadiene, divinylbenzenes), oligomeres of epichlorhydrin and the like, epoxy ethers of polyvalent alcohols (ethylene glycols, propylene glycols and butylene glycols, polyglycols, thiodiglycols, glycerine, pentaerythritol, sorbitol, polyvinyl alcohol, polyallyl alcohol etc.), epoxy ethers of polyvalent phenols (resorcinol, hydroquinone, bis-(4-oxo-phenyl)-methane,
bis-(4-oxy-3-methylphenyl)-methane,
bis-(4-oxy-3,5-dichlorophenyl)-methane,
bis-(4-oxy-3,5-dibromophenyl)-methane,
bis-(4-oxy-3,5-difluorophenyl)-methane,
1,1-bis-(4-oxyphenyl)-ethane,
2,2-bis-(4-oxyphenyl)-propane,
2,2-bis-(4-oxy-3-methylphenyl)-propane,
2,2-bis-(4-oxy-5-chlorophenyl)-propane,
2,2-bis-(4-oxy-3,5-dichlorophenyl)-propane,
bis-(4-oxyphenyl)-phenylmethane,
bis-(4-oxyphenyl)-diphenylmethane,
bis-(4-oxyphenyl)-4'-methylphenylmethane,
1,1-bis-(4-oxyphenyl)2,2,2-trichloroethane,
bis-(4-oxyphenyl)-4-(chlorophenyl)-methane,
1,1-bis-(4-oxyphenyl)-cyclohexane,
bis-(4-oxyphenyl)-cyclohexylmethane,
4,4'-dioxydiphenyl,
2,2'-dioxydiphenyl,
4,4'-dioxydiphenylsulfone and the oxyethylethers and phenolformaldehyde condensation products thereof), nitrogenous epoxies (N,N-dimethyldiglycidyl - 4,4 - diaminodiphenylmethane) and also polyepoxy compounds which have been made by prior art methods from polyunsaturated carboxylic acids or monounsaturated carboxylic acid esters of unsaturated alcohols, glycidyl esters of polybasic carboxylic acids, polyglycidyl esters which can be obtained by polymerization or copolymerization of glycidyl esters of unsaturated acids, or of other acid compounds (cyanuric acid and cyclic trimethylentrisulfone or their derivatives, etc.).

In addition to the epoxy compounds with 2 and more epoxy groups cited by way of examples, mixtures of the same with monoepoxies can be used for the manufacture of the flame resistant compounds. For example, the monoepoxies of the following types of compounds can be used: monounsaturated hydrocarbons (ethylene, propylene, butylene, cyclohexene, styrene), halogenous epoxies (epichlorhydrine), epoxyethers of univalent alcohols (methyl, ethyl, butyl, 2-methylhexyl and dodecyl alcohol, etc.), epoxyethers of univalent phenols (phenol, cresol and other phenols substituted in the ortho or para position), glycidyl esters of unsaturated carboxylic acids, epoxidized esters of unsaturated alcohols or unsaturated carboxylic acids, and the acetals of glycidaldehyde.

To harden the epoxy resins, stoichiometric amounts of the hardener of the invention are used as a rule, i.e., one acid anhydride group per epoxy group. It may sometimes be advantageous, however, to use more or less than stoichiometric amounts. The amount of hardener can be conventional. The high phosphorous content of the hardeners of the invention even make it possible to combine them with certain amounts of other hardeners without impairment of the flame resistant characteristic. Likewise, fillers, dyes, pigments, solvents or flexibilizers can be added prior to hardening.

Hardening with the above-described phosphorous compounds of the present invention is best performed at elevated temperature. It may prove expedient to mix the hardeners with the epoxy resins or epoxy compounds at moderate temperatures at first (i.e., ranging from 30 to 70° C.), and then harden them at a higher temperature. In some cases it is possible to obtain products with improved mechanical characteristics by a post-hardening at a temperature that is 30 to 50° C. above the hardening temperatures. Usually the hardening is performed at a temperature ranging from 100° to 150° C. The hardening temperature is lowered without increasing the hardening time by the use of accelerators.

The manufacture of flame resistant molding and coating compounds by the phosphorous hardeners of the invention can be hastened, if desired, by the addition of known accelerating substances from the group of the univalent or multivalent phenols, especially the aminophenols or the univalent or multivalent alcohols, or also by means of compounds which contain mercaptoethers or thioethers or dithioethers or compounds of the nitrogen-carbon-sulfur groupings, or a sulfoxy group, or by means of Lewis acids.

The epoxy resins mixed with the hardeners of the invention can be used to special advantage as non-combustible casting resins in the electrical industry and as non-combustible varnishes, and also for the manufacture of difficultly flammable molded articles, as a result of their high phosphorous content.

The following experiments are intended to illustrate the molding and coating compounds according to the invention:

EXAMPLE 1

100 grams of a diglycidyl ether of 2,2-bis-(4-oxyphenyl)-propane with an epoxy value of 0.53 per 100 g. of resin were mixed with 54 g. of 2-chloro-4-oxo-5,6-benzo-1,3,2-dioxaphosphorinine at 40° C., and hardened at 130° C. to a solid plastic block in 20 minutes. The plastic exhibited flame resistant characteristics and had a Martens value of 82° C.

EXAMPLE 1a

A similar result has been obtained by using 61 g. of 2-bromo-4-oxo-5,6-benzo-1,3,2 - dioxaphosphorinine instead of the above named 2-chloro-compound.

EXAMPLE 2

50 g. of a diglicidyl ether of 2,2-bis-(4-oxyphenyl)-propane with an epoxy value of 0.53 per 100 g. of resin were hardened in 40 minutes at 100° C. with 24 g. of 2-chloro-4-oxo-5,6-benzo-1,3,2-dioxaphosphorinine and 2 g. of triethylene glycol in the presence of 0.5 g. of 2,4,6-tris-(dimethylaminomethyl)-phenol. The plastic exhibited a Martens value of 74° C. and flame resistant characteristics.

EXAMPLE 3

50 g. of a diglycidyl ether of 2,2-bis-(4-oxyphenyl)-propane with an epoxy value of 0.53 per 100 g. of resin were mixed at 50° C. with 13 g. of 2-chloro-4-oxo-5,6-benzo-1,3,2-dioxaphosphorinine and 9.5 g. of 2,4-dioxo-2-chloro-5,6-benzo-1,3,2-dioxaphosphorinine and hardened in 60 minutes at 150° C. in the presence of 0.5 g. of 2,4,6-tris-(dimethylaminomethyl)-phenol. The plastic showed a Martens value of 95° C. and flame resistant properties.

EXAMPLE 4

50 g. of diglycidyl ether of 2,2-bis-(4-oxyphenyl)-propane with an epoxy value of 0.53 per 100 g. of resin were mixed with 30 g. of 2,4-dioxo-2-ethoxy-5,6-benzo-1,3,2-dioxaphosphorinine at room temperature, and hardened in 60 minutes at 150° C. in the presence of 0.5 g. of $ZnCl_2$ dissolved in 1 g. of glycerine. The plastic exhibited a Martens value of 65° C. and flame resistant properties.

EXAMPLE 4a

A similar result has been obtained by using 35 g. of 2,4-dioxo - 2 - (p-chlorophenoxy)-5,6-benzo-1,3,2-dioxaphosphorinine instead of 2,4-dioxo-2-ethoxy-5,6-benzo-1,3,2-dioxaphosphorinine.

EXAMPLE 5

100 g. of a diglycidyl ether of 2,2-bis-(4-oxyphenyl)-propane with an epoxy value of 0.53 per 100 g. of resin were mixed with 56 g. of 2,4-dioxo-2-ethyl-5,6-benzo-1,3,2-dioxophosphorinine and hardened in 75 minutes at 150° C. in the presence of 0.5 g. of KSCN into a solid block. The block exhibited flame resistant properties and had a Martens value of 92° C.

EXAMPLE 6

25 g. of resorcinol diglycidyl ether with an epoxy value of 0.76 per 100 g. of epoxy compound were mixed at 60° C. with 40 g. of 2,4-dioxo-2-ethyl-5,6-benzo-1,3,2-dioxaphosphorinine, and hardened into a solid block in 30 minutes at 150° C. in the presence of 0.5 g. of 2,4,6-tris-(dimethylaminomethyl)-phenol. The block showed flame resistant characteristics.

EXAMPLE 7

25 g. of novolak glycidyl ether with an epoxy value of 0.56 per 100 g. of resin were mixed at 70° C. with 30 g. of 2,4 - dioxo-2-ethyl-5,6 - benzo-1,3,2-dioxaphosphorinine, and hardened in the presence of 0.25 g. of $ZnCl_2$ into a solid block within 60 minutes at 150° C. The block showed flame resistant qualities.

EXAMPLE 8

25 g. of a diglycidyl ether of 1,4-butanediol with an epoxy value of 0.76 per 100 g. of epoxy compound were mixed at 40° C. with 40 g. of 4-dioxo-2-ethyl-5,6-benzo-1,3,2-dioxaphosphorinine, and hardened into a solid block in 60 minutes at 40° C. in the presence of 0.25 g. of $ZnCl_2$. The block showed flame resistant qualities.

EXAMPLE 9

25 g. of 4-vinylcyclohexene dioxide with an epoxy value of 1.38 per 100 g. of epoxy compound were mixed at 40° C. with 37 g. of 2,4-dioxo-2-ethyl-5,6-benzo-1,3,2-dioxaphosphorinine, and hardened into a solid block in 85 minutes at 120° C. in the presence of 0.5 g. of 2,4,6-tris - (dimethalaminomethyl)-phenol. The block showed flame resistant qualities.

EXAMPLE 10

50 g. of a polyglycidyl ether mixture, consisting of 40 g. of a diglycidyl ether of 2,2-bis-(4-oxyphenyl)-propane (epoxy value 0.53 per 100 g. of resin) and 10 g. of a diglycidyl ether of 1,4-butanediol (epoxy value 0.76 per 100 g. of epoxy compound), were mixed with 30 g. of 2-chloro-4-oxo-5,6-benzo-1,3,2-dioxaphosphorinine at 40° C., and hardened at 130° C. in 35 minutes into a solid block which exhibited flame resistant properties.

The examples listed in the following table show the use of hardeners of the invention mixed, in some of the examples, with hardeners of the prior art. The epoxy resin was a diglycidyl ether of 2,2-bis-(4-oxyphenyl)-propane with an epoxy value of 0.53 per 100 g. of resin. In each case, the epoxy resin and hardeners of the type listed in the table were mixed together in the usual way and hardened as specified. The table shows the obtained values of the mechanical characteristics as determined on specimens made as above.

| Ex. | Epoxy resin, parts by wt. | Hardener | Quantity, parts by wt. | Catalyst, parts by wt. | Hardening Min. | Hardening Temp., °C. | Tensile strength, kg. per cm.² | Bending strength, kg. per cm.² | Impact strength, cm.-kg. cm.² | Hardness in kg. cm.² | Vicat value in deg. C. |
|---|---|---|---|---|---|---|---|---|---|---|---|
| 11 | 50 | 2-chloro-4-oxo-5,6-benzo-1,3,2-dioxaphosphorinine. | 14 | 0.5 ZnCl₂ | 30 | 150 | 430 | 922 | 11.3 | 1,384–1,326 | 134 |
| 12 | 50 | 2-chloro-4-oxo-5,6-benzo-1,3,2-dioxaphosphorinine and phthalic acid anhydride. | 14 20 | 0.5 ZnCl₂ | 73 | 150 | 510 | 1125 | 10.2 | 1,273–1,224 | 145 |
| 13 | 50 | 2-chloro-4-oxo-5,6-benzo-1,3,2-dioxaphosphorinine and chlorophthalic acid anhydride. | 7 13 | 0.5 ZnCl₂ | 32 | 150 | 462 | 1156 | 18.2 | 1,224–1,179 | 146 |
| 14 | 50 | 2-chloro-4-oxo-5,6-benzo-1,3,2-dioxaphosphorinine and 2,4-dioxo-2-chloro-5,6-benzo-1,3,2-dioxaphosphorinine. | 7.5 7.5 | 0.5 ZnCl₂ | 37 | 150 | 462 | 1204 | 23.3 | 1,273–1,224 | 175 |
| 15 | 50 | 2-chloro-4-oxo-5,6-benzo-1,3,2-dioxaphosphorinine, phthalic acid anhydride, and Comerginol 65.* | 7 10 4 | 0.5 ZnCl₂ | 35 | 150 | 487 | 1189 | 13.6 | 1,224–1,179 | 137 |
| 16 | 50 | 2-chloro-4-oxo-5,6-benzo-1,3,2-dioxaphosphorinine, 2,4-dioxo-2-ethoxy-5,6-benzo-1,3,2-dioxaphosphorinine, Comerginol 65.* | 7 15 4 | 0.5 ZnCl₂ | 80 | 150 | 474 | 723 | 14.6 | 1,326–1,273 | 125 |

* "Comerginol 65" is a hardener made by Harburger Fettchemie, Brinkmann & Mergel, of Hamburg-Harburg. It is manufactured by copolymerization of unsaturated fatty acids with other unsaturated monomers, followed by hydrogenation of the carboxyl groups.

EXAMPLE 17

(a) Preparation of the hardener 43.9 g. of 2,4-dioxo-2-chloro-5,6-benzo-1,3,2-dioxaphosphorinine were dissolved in 150 ml. of benzene. To this solution were dropwise added within 1 hour 6.2 g. of ethylene glycol and 15.8 g. of pyridine at 30° C. This mixture was heated for 3 hours under reflux. After cooling the pyridine salt was removed by filtration and the benzene was distilled off under vacuum. 41 g. of crude bis-1,2'-(4-oxo-5,6-benzo-1,3,2 - dioxaphosphorinine-1,2-dioxyethane were obtained as a brownish viscous oil.

(b) Application of the hardener according to the invention 50 g. of a diglycidylether of 2,2-bis(4-oxyphenyl)-propane with an epoxy value of 0.53 per 100 g. of resin were mixed at room temperature with 40 g. of the crude bis-1,2'-(2,4-dioxo-5,6-benzo - 1,3,2 - dioxaphosphorinine)-1,2-dioxyethane, obtained according to Example 17a, and were hardened within 60 minutes at 150° C. in the presence of 0.5 g. of ZnCl₂, which was dissolved in 1 g. glycerol. The hardened resin had a Martens value of 62° C. The material is flame resistant.

EXAMPLE 18

(a) Preparation of the hardener 45.8 g. of salicylic acid were heated under reflux together with 56 g. of trimethylene-diphosphinic dichloride in 400 ml. of benzene for 7 hours. After distilling off the benzene in the vacuum there remained 80 g. of crude bis 2,2'-(2,4-dioxo-5,6-benzo - 1,3,2 - dioxaphosphorinine)-1,3-propane as brown viscous oil.

(b) Application of the hardener according to the invention 50 g. of a diglycidylether of 2,2-bis-(4-oxyphenyl)-propane with an epoxy value of 0.53/per 100 g. of resin were mixed at room temperature with 46 g. of crude bis-2,2'-(2,4-dioxo-5,6 - benzo-1,2,3-dioxaphosphorinine)-1,3-propane, obtained according to Example 18a, and were hardened within 45 minutes at 150° C. in the presence of 0.5 g. of ZnCl₂, which was dissolved in 1 g. of glycerol.

The hardened resin had a Martens value of 70° C. The material is flame resistant.

What is claimed is:

1. Process for production of flame resistant resins from epoxy compounds which comprises hardening epoxy compounds having more than one 1,2 epoxy group per molecule, with a compound of the formula

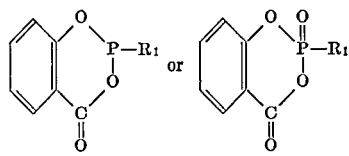

wherein R₁ is chlorine, bromine, thiocyano, alkyl, aryl, aralkyl, alkaryl, chloralkyl, alkoxy, aryloxy or cycloalkyl.

2. Process for production of flame resistant resins from epoxy compounds which comprises hardening epoxy compounds having more than one 1,2 epoxy group per molecule, with a compound of the formula

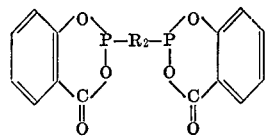

or

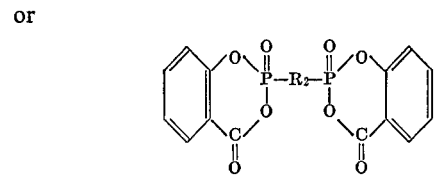

wherein R₂ is an alkoxylene, or alkylene radical.

3. Process according to claim 1, wherein the epoxy compound hardened is admixed with 1,2, monoepoxy compound.

4. Process according to claim 2, wherein the epoxy compound hardened is admixed with 1,2 monoepoxy compound.

5. Process for production of flame resistant resins from epoxy compounds which comprises hardening epoxy compounds having more than 1,2 epoxy group per molecule, with a compound of the formula

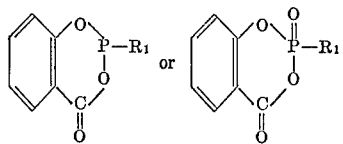

wherein $R_1$ is alkyl, chloro, or alkoxy.

6. Hardened epoxy resin produced by the process of claim 1.

7. Hardened epoxy resin produced by the process of claim 2.

8. Process according to claim 1, wherein the resin is hardened at a temperature of about 100–150° C.

9. Process according to claim 2, wherein the resin is hardened at a temperature of about 100–150° C.

References Cited

UNITED STATES PATENTS 3,378,526   4/1968   Vogt et al.

WILLIAM H. SHORT, Primary Examiner

T. PERTILLA, Assistant Examiner

U.S. Cl. X.R.

117—161; 260—47, 59, 88.3

PO-1050
(5/69)

UNITED STATES PATENT OFFICE
CERTIFICATE OF CORRECTION

Patent No. 3,520,832                  Dated July 21, 1970

Inventor(s) Wilhelm Vogt, et al.

It is certified that error appears in the above-identified patent and that said Letters Patent are hereby corrected as shown below:

Col. 2, lines 50-55, the structural formula on the right hand side, should be:

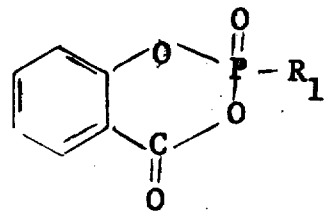

Col. 3, line 64, "dioxophos-" should be --dioxaphos-- .

Col. 6, line 16 "dioxophosphorinine" should be --dioxaphosphorinine--.

Signed and sealed this 27th day of April 1971.

(SEAL)
Attest:

EDWARD M. FLETCHER, JR.
Attesting Officer

WILLIAM E. SCHUYLER, JR.
Commissioner of Patents